(12) United States Patent
El-Kahlout et al.

(10) Patent No.: US 10,604,436 B2
(45) Date of Patent: Mar. 31, 2020

(54) METHOD OF PRODUCING GLASS RIBBON

(71) Applicant: CORNING INCORPORATED, Corning, NY (US)

(72) Inventors: Ahdi El-Kahlout, Lexington, KY (US); Soongyup Lee, Elgin, IL (US); Yi-Ming Liu, Tainan (TW); Douglas John Tanaka, Lexington, KY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/092,132

(22) PCT Filed: Apr. 4, 2017

(86) PCT No.: PCT/US2017/025881
§ 371 (c)(1),
(2) Date: Oct. 8, 2018

(87) PCT Pub. No.: WO2017/176703
PCT Pub. Date: Oct. 12, 2017

(65) Prior Publication Data
US 2019/0135674 A1 May 9, 2019

Related U.S. Application Data

(63) Continuation of application No. 15/091,656, filed on Apr. 6, 2016, now Pat. No. 9,758,418.

(51) Int. Cl.
*C03B 17/06* (2006.01)
(52) U.S. Cl.
CPC ......... *C03B 17/067* (2013.01); *C03B 17/064* (2013.01)

(58) Field of Classification Search
CPC ............................ C03B 17/067; C03B 17/064
See application file for complete search history.

(56) References Cited

U.S. PATENT DOCUMENTS

| | | | |
|---|---|---|---|
| 2,928,212 A | 3/1960 | Long | |
| 3,223,498 A | 12/1965 | Davidson, Jr. | |

(Continued)

FOREIGN PATENT DOCUMENTS

| | | |
|---|---|---|
| GB | 786399 A | 11/1957 |
| GB | 1354006 A | 6/1974 |
| WO | 2014193780 A1 | 12/2014 |

OTHER PUBLICATIONS

International Search Report and Written Opinion PCT/US2017/025881 dated Jun. 29, 2017.

*Primary Examiner* — Nahida Sultana
(74) *Attorney, Agent, or Firm* — Kevin M. Able; Matthew B McNutt

(57) ABSTRACT

Methods for producing a glass ribbon include drawing a quantity of molten material from a forming vessel into a glass ribbon with the forming vessel positioned within a first portion of a housing located within an upper chamber. The methods further include drawing the glass ribbon along a draw path passing through a second portion of the housing at least partially located within a lower chamber. The methods further include venting gas from an interior of housing through a wall of the second portion of the housing. In one example, the method further includes maintaining a pressure difference between the lower chamber and the upper chamber. In another example, the method includes maintaining a pressure difference between the interior of the housing and the upper chamber.

22 Claims, 4 Drawing Sheets

(56) References Cited

U.S. PATENT DOCUMENTS

| | | | |
|---|---|---|---|
| 3,232,733 A | 2/1966 | Ward | |
| 3,775,080 A | 11/1973 | Brichard | |
| 3,798,015 A | 3/1974 | Brichard | |
| 3,801,411 A | 4/1974 | Brichard | |
| 7,818,980 B2 | 10/2010 | Burdette et al. | |
| 8,322,160 B2 | 12/2012 | Nishiura et al. | |
| 8,375,747 B2 | 2/2013 | De Angelis et al. | |
| 8,397,536 B2 | 3/2013 | Delia et al. | |
| 8,459,062 B2 | 6/2013 | Ahrens et al. | |
| 8,707,737 B2 | 4/2014 | Chalk et al. | |
| 8,820,118 B2 | 9/2014 | Ahrens et al. | |
| 9,233,869 B2 | 1/2016 | Pitbladdo | |
| 9,296,635 B2 | 3/2016 | Chalk et al. | |
| 2003/0029199 A1* | 2/2003 | Pitbladdo | C03B 17/064 65/195 |
| 2006/0242996 A1 | 11/2006 | Deangelis et al. | |
| 2007/0089459 A1* | 4/2007 | Vild | C03B 23/0256 65/106 |
| 2010/0122556 A1 | 5/2010 | Kin et al. | |
| 2011/0126591 A1 | 6/2011 | Chalk et al. | |
| 2011/0126592 A1* | 6/2011 | De Angelis | C03B 5/16 65/90 |
| 2011/0177287 A1 | 7/2011 | Kato et al. | |
| 2013/0133368 A1* | 5/2013 | Fournel | C03B 17/064 65/53 |
| 2014/0013805 A1 | 1/2014 | Kariya et al. | |
| 2016/0016838 A1 | 1/2016 | Aburada et al. | |
| 2017/0283294 A1* | 10/2017 | Delia | C03B 5/1675 |
| 2018/0319694 A1* | 11/2018 | Aniolek | C03B 17/064 |
| 2019/0194055 A1* | 6/2019 | Mori | C03B 35/18 |

\* cited by examiner

METHOD OF PRODUCING GLASS RIBBON

CROSS-REFERENCE TO RELATED APPLICATIONS

This application claims the benefit of priority under 35 U.S.C. § 371 of International Patent Application Serial No. PCT/US2017/025881, filed on Apr. 4, 2017, which in turn, claims the benefit of priority of U.S. patent application Ser. No. 15/091,656 filed on Apr. 6, 2016, now U.S. Pat. No. 9,758,418, the contents of each of which are relied upon and incorporated herein by reference in their entireties.

FIELD

The present disclosure relates generally to methods of producing glass ribbon and, more particularly, to methods of producing glass ribbon including the step of venting gas from an interior of a housing.

BACKGROUND

It is known to process molten material into a glass ribbon. It is further known to draw molten material to facilitate a desired thickness of the glass ribbon.

SUMMARY

The following presents a simplified summary of the disclosure in order to provide a basic understanding of some exemplary embodiments described in the detailed description.

In one embodiment, a method is provided for producing a glass ribbon comprising drawing a quantity of molten material from a forming vessel into a glass ribbon. The forming vessel is positioned within a first portion of a housing located within an upper chamber. The method may further include drawing the glass ribbon along a draw path passing through a second portion of the housing at least partially located within a lower chamber. The method may further include venting gas from an interior of the housing through a wall of the second portion of the housing. The method may still further include maintaining a pressure difference between the lower chamber and the upper chamber such that a pressure of the lower chamber is greater than a pressure of the upper chamber.

In one embodiment, the method may further comprise circulating gas from the upper chamber to the lower chamber to facilitate maintenance of the pressure difference.

In another embodiment, the method may further comprise introducing gas into the upper chamber to facilitate maintaining the pressure of the upper chamber.

In another embodiment, the method may comprise introducing gas into the lower chamber to facilitate maintaining the pressure of the lower chamber.

In another embodiment, the pressure difference is maintained from about 2 Pa to about 12 Pa.

In another embodiment, the pressure difference is maintained from about 5 Pa to about 8 Pa.

In another embodiment, the method may further comprise maintaining a pressure difference between the interior of the housing and the upper chamber, wherein a pressure of the interior of the housing is greater than the pressure of the upper chamber.

In another embodiment, a method of producing a glass ribbon comprises drawing a quantity of molten material from a forming vessel into a glass ribbon. The forming vessel may be positioned within a first portion of a housing located within an upper chamber. The method may further include drawing the glass ribbon along a draw path passing through a second portion of the housing at least partially located within a lower chamber. The method may further include venting gas from an interior of the housing through a wall of the second portion of the housing. The method may further comprise maintaining a pressure difference between the interior of the housing and the upper chamber. A pressure of the interior of the housing can be greater than the pressure of the upper chamber.

In any of the above embodiments, drawing the quantity of molten material can comprise drawing the quantity of molten material from a root of a wedge of the forming vessel.

In any of the above embodiments, the pressure difference between the interior of the housing and the upper chamber can be maintained from about 5 Pa to about 60 Pa.

In any of the above embodiments, the pressure difference between the interior of the housing and the upper chamber can be maintained from about 10 Pa to about 30 Pa.

In any of the above embodiments, venting gas can comprise passing the venting gas through at least one vent passing through the wall of the second portion of the housing.

In any of the above embodiments, the method can further comprise adjusting the at least one vent to modify a resistance of a flow of gas passing through the at least one vent.

In any of the above embodiments, the at least one vent can comprise a plurality of vents positioned along a vent axis transverse to the draw path.

In any of the above embodiments, the method can include the step of adjusting at least two of the plurality of vents to modify a relative resistance gas flowing through the at least two adjusted vents.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

BRIEF DESCRIPTION OF THE DRAWINGS

These and other features, aspects, and advantages of the present disclosure can be further understood when read with reference to the accompanying drawings.

DETAILED DESCRIPTION

Figure 1:
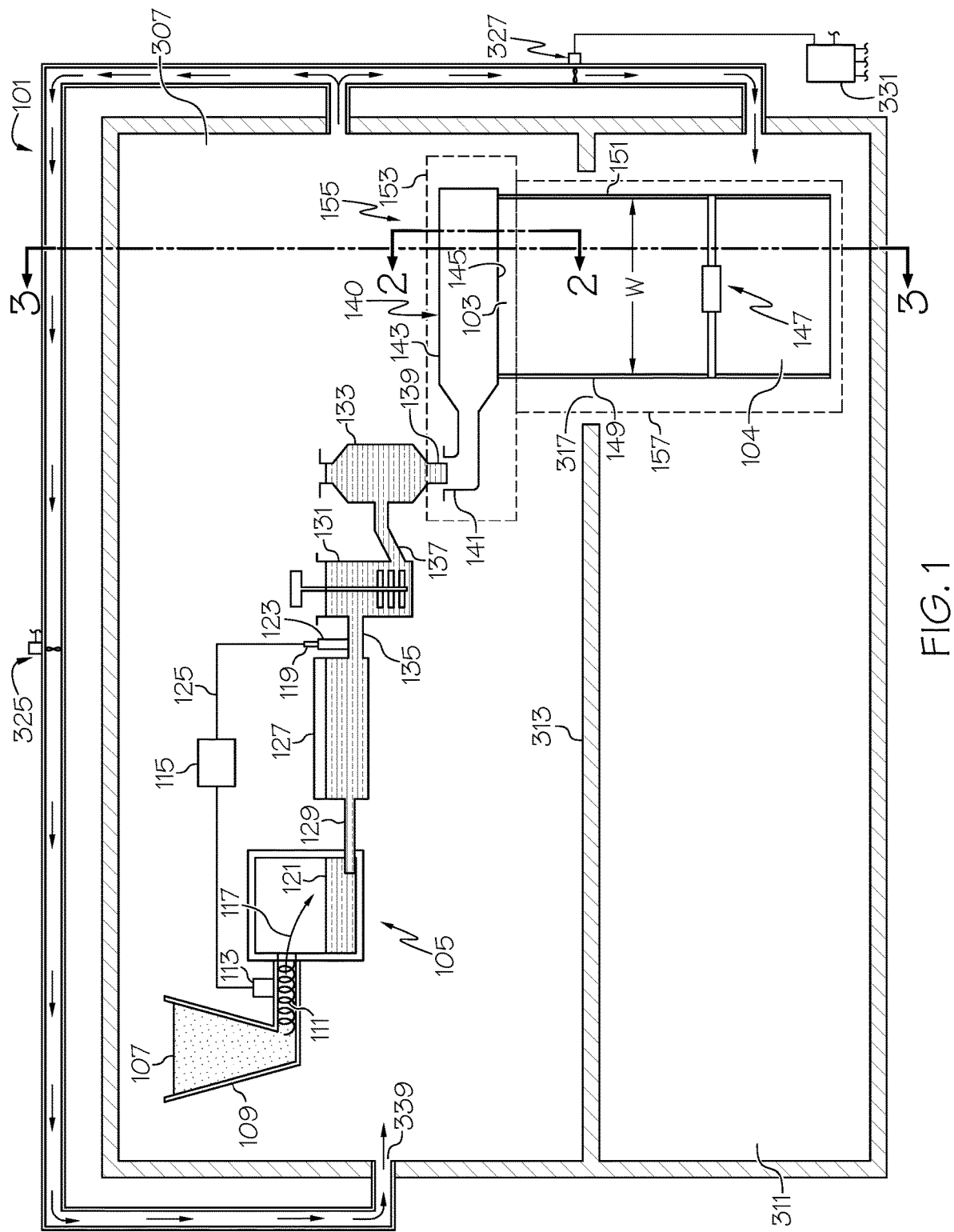
FIG. 1 is a schematic view of an exemplary glass processing apparatus including a fusion down-draw apparatus to draw a glass ribbon.

Apparatus and methods will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

Glass sheets are commonly fabricated by flowing molten glass to a forming vessel whereby a glass ribbon may be formed by a variety of ribbon forming processes including slot draw, down-draw, fusion down-draw, press rolling, or other forming process. The glass ribbon from any of these processes may then be subsequently divided to provide one or more glass sheets suitable for further processing into a desired application, including but not limited to, a display application. For example, the one or more glass sheets can be used in a variety of display applications, including liquid crystal displays (LCDs), electrophoretic displays (EPD), organic light emitting diode displays (OLEDs), plasma display panels (PDPs), or the like.

The present disclosure will now be described with respect to the glass forming apparatus 101 that is schematically illustrated as a fusion down-draw apparatus in the figures. Although not shown, features of the disclosure may be incorporated into other apparatus for forming a glass ribbon such as a slot-draw apparatus, a press-rolling apparatus, another down-draw apparatus, or other glass forming apparatus.

Figure 2:
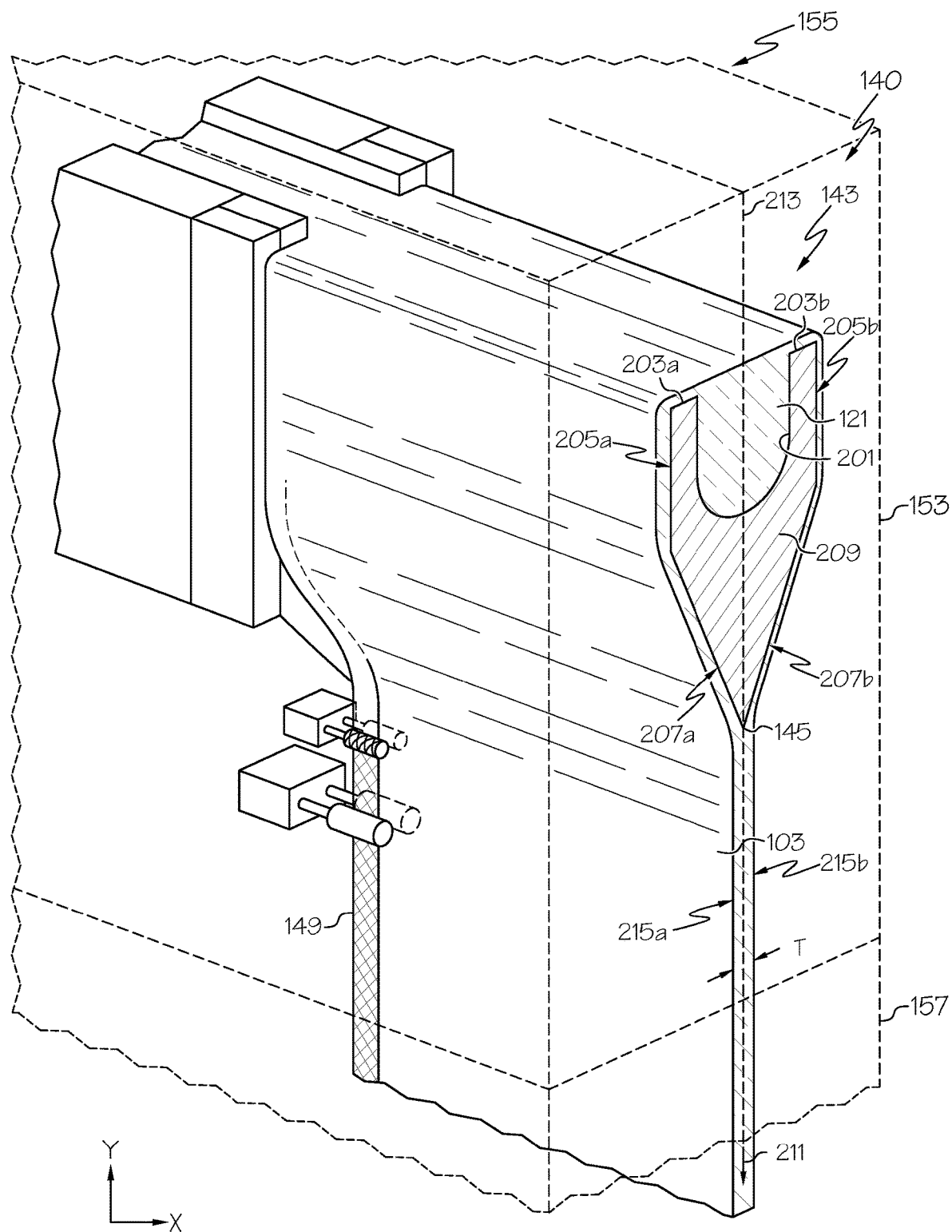
FIG. 2 is a cross-sectional perspective view of the fusion down-draw apparatus along line 2-2 of FIG. 1.
Figure 3:
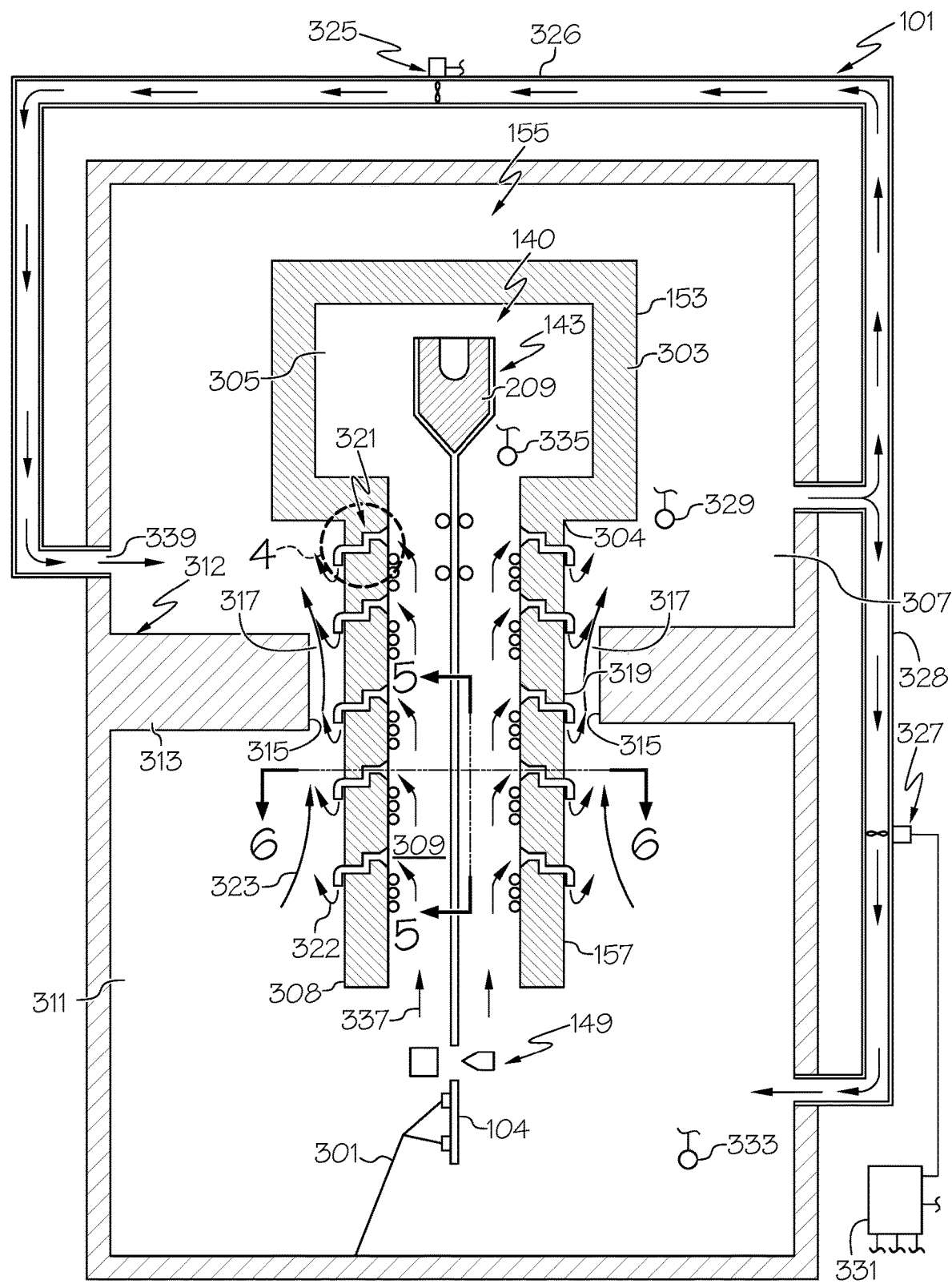
FIG. 3 is a cross-sectional schematic view of the fusion down-draw apparatus along line 3-3 of FIG. 1.

As shown in FIGS. 1-3, the glass forming apparatus 101 can include a melting vessel 105 oriented to receive batch material 107 from a storage bin 109. The batch material 107 can be introduced by a batch delivery device 111 powered by a motor 113. An optional controller 115 can activate the motor 113 to introduce a desired amount of batch material 107 into the melting vessel 105, as indicated by arrow 117. A glass melt probe 119 can be used to measure a level of molten material 121 within a standpipe 123 and communicate the measured information to the controller 115 by way of a communication line 125.

The glass forming apparatus 101 can also include a fining vessel 127 located downstream from the melting vessel 105 and coupled to the melting vessel 105 by way of a first connecting conduit 129. In some embodiments, molten material 121 may be gravity fed from the melting vessel 105 to the fining vessel 127 by way of the first connecting conduit 129. For instance, gravity may drive the molten material 121 through an interior pathway of the first connecting conduit 129 from the melting vessel 105 to the fining vessel 127. Within the fining vessel 127, bubbles may be removed from the molten material 121 by various techniques.

The glass forming apparatus 101 can further include a mixing chamber 131 that may be located downstream from the fining vessel 127. The mixing chamber 131 can be used to provide a homogenous composition of molten material 121, thereby reducing or eliminating inhomogeneities that may otherwise exist within the molten material 121 exiting the fining vessel 127. As shown, the fining vessel 127 may be coupled to the mixing chamber 131 by way of a second connecting conduit 135. In some embodiments, molten material 121 may be gravity fed from the fining vessel 127 to the mixing chamber 131 by way of the second connecting conduit 135. For instance, gravity may drive the molten material 121 through an interior pathway of the second connecting conduit 135 from the fining vessel 127 to the mixing chamber 131.

The glass forming apparatus 101 can further include a delivery vessel 133 that may be located downstream from the mixing chamber 131. The delivery vessel 133 may condition the molten material 121 to be fed into a glass former 140. For instance, the delivery vessel 133 can act as an accumulator and/or flow controller to adjust and provide a consistent flow of molten material 121 to the glass former 140. As shown, the mixing chamber 131 may be coupled to the delivery vessel 133 by way of a third connecting conduit 137. In some embodiments, molten material 121 may be gravity fed from the mixing chamber 131 to the delivery vessel 133 by way of the third connecting conduit 137. For instance, gravity may drive the molten material 121 through an interior pathway of the third connecting conduit 137 from the mixing chamber 131 to the delivery vessel 133.

As further illustrated, a delivery pipe 139 can be positioned to deliver molten material 121 to the glass former 140 of the glass forming apparatus 101. As discussed more fully below, the glass former 140 may draw the molten material 121 into the glass ribbon 103 off of a root 145 of a forming vessel 143. In the illustrated embodiment, the forming vessel 143 can be provided with an inlet 141 oriented to receive molten material 121 from the delivery pipe 139 of the delivery vessel 133.

FIG. 2 is a cross-sectional perspective view of the glass forming apparatus 101 along line 2-2 of FIG. 1. As shown, the forming vessel 143 can include a trough 201 that receives the molten material 121 from the inlet 141. The forming vessel 143 can further include a forming wedge 209 including a pair of downwardly inclined converging surface portions 207a, 207b extending between opposed ends of the forming wedge 209. The pair of downwardly inclined converging surface portions 207a, 207b converge along a draw direction 211 to form the root 145. A draw plane 213 extends through the root 145 wherein the glass ribbon 103 may be drawn in the draw direction 211 along the draw plane 213. As shown, the draw plane 213 can bisect the root 145, although the draw plane 213 may extend at other orientations relative to the root 145.

Referring to FIG. 2, in one embodiment, the molten material 121 can flow from the inlet 141 into the trough 201 of the forming vessel 143. The molten material 121 can then overflow from the trough 201 by simultaneously flowing over corresponding weirs 203a, 203b and downward over the outer surfaces 205a, 205b of the corresponding weirs 203a, 203b. Respective streams of molten material 121 then flow along the downwardly inclined converging surface portions 207a, 207b of the forming wedge 209 to be drawn off the root 145 of the forming vessel 143, where the flows converge and fuse into the glass ribbon 103. The glass ribbon 103 may then be fusion drawn off the root 145 in the draw plane 213 along draw direction 211 with a first major surface 215a of the glass ribbon 103 and a second major surface 215b of the glass ribbon 103.

As shown in FIG. 2, the first major surface 215a of the glass ribbon 103 and the second major surface 215b of the glass ribbon 103 can face opposite directions and define a thickness "T" of the glass ribbon 103 that can be less than or equal to about 1 millimeter (mm), less than or equal to about 0.5 millimeters, less than or equal to about 500 micrometers (μm), such as less than or equal to about 300 micrometers, such as less than or equal to about 200 micrometers, or such as less than or equal to about 100 micrometers, although other thicknesses may be used in further embodiments. In other embodiments, the thickness "T" of the glass ribbon 103 can be from about 100 micrometers to about 0.5 millimeters, from about 300 micrometers to about 0.4 millimeters, or from about 0.3 millimeters to about 500 micrometers, and all sub-ranges therebetween. In some embodiments, the thickness "T" of the glass ribbon 103 can be from about 50 micrometers to about 500 micrometers, such as from about 50 micrometers to about 300 micrometers, such as from about 50 micrometers to about 200 micrometers, such as from about 50 micrometers to about 100 micrometers, and all ranges and subranges therebetween. In further embodiments, the thickness "T" of the glass ribbon 103 can be greater than 1 millimeter, for example from about 1 millimeter to about 3 millimeters and all subranges therebetween. Regardless of the source or method of production, the glass ribbon 103 and the glass sheet 104 separated from the glass ribbon 103 can, in some embodiments, include a thickness within a range of from about 50 micrometers to 1000 micrometers, including all ranges and sub-ranges discussed above, although other thicknesses may be provided in further embodiments.

In some embodiments, referring to FIG. 1, a width "W" of the glass ribbon 103 between opposed outer edges 149, 151 of the glass ribbon can be greater than or equal to about 20 mm, such as greater than or equal to about 50 mm, such as greater than or equal to about 100 mm, such as greater than or equal to about 500 mm, such as greater than or equal to about 1000 mm, such as greater than or equal to about 2000 mm, such as greater than or equal to about 3000 mm, such as greater than or equal to about 4000 mm, although other widths less than or greater than the widths mentioned above can be provided in further embodiments.

In some embodiments, the width "W" of the glass ribbon 103 can be from about 20 mm to about 4000 mm, such as from about 50 mm to about 4000 mm, such as from about 100 mm to about 4000 mm, such as from about 500 mm to about 4000 mm, such as from about 1000 mm to about 4000 mm, such as from about 2000 mm to about 4000 mm, such as from about 3000 mm to about 4000 mm, such as from about 20 mm to about 3000 mm, such as from about 50 mm to about 3000 mm, such as from about 100 mm to about 3000 mm, such as from about 500 mm to about 3000 mm, such as from about 1000 mm to about 3000 mm, such as from about 2000 mm to about 3000 mm, such as from about 2000 mm to about 2500 mm, and all ranges and subranges therebetween.

The glass ribbon 103 can include a variety of compositions including but not limited to soda-lime glass, borosilicate glass, alumino-borosilicate glass, an alkali-containing glass, or an alkali-free glass.

In some embodiments, as shown in FIGS. 1 and 3, the glass ribbon 103 can be separated into one or more glass sheets 104 by a glass separator 147. A variety of glass separators 147 may be provided in embodiments of the present disclosure. For example, a traveling anvil machine may be provided that can score and then break the glass ribbon 103 along a score line. As shown in FIG. 3, in some embodiments, a robot 301 (e.g., a robotic arm) can be oriented to bend the glass sheet 104 relative to the glass ribbon 103 to separate the glass sheet 104 from the glass ribbon 103 along a transverse separation path corresponding to the score line. In further embodiments, a laser-assisted separation device may be provided to facilitate separation along the transverse path.

Referring to FIGS. 1-3, the glass forming apparatus 101 includes a housing 155 that houses at least portions of the forming vessel 143 and glass ribbon 103 being drawn from the forming vessel 143. The housing 155 can comprise at least one wall that may comprise refractory material such as ceramic (e.g., ceramic brick) or other high temperature materials. For example, as shown in FIG. 3, the at least one wall can comprise an upper wall 303 and a lower wall 308.

As shown in FIGS. 1-3, the forming vessel 143 can be positioned within a first portion 153 of a housing 155. As indicated in FIG. 1, the first portion 153 of the housing 155 may provide a housing for the forming vessel 143 such that the inlet 141 and the forming wedge 209 of the forming vessel 143 are both housed within an upper interior chamber 305 defined by the upper wall 303 of the first portion 153 of the housing 155. In some embodiments, the first portion 153 of the housing 155 may provide a housing for the forming wedge 209 without providing the housing for the inlet 141. For example, the inlet may be positioned outside of the first portion 153 of the housing 155. However, the first portion 153 of the housing 155 may house the entire forming vessel 143, as shown, including the forming wedge 209 and the inlet 141 to help control a temperature of the molten material 121 within the forming vessel 143. As can be appreciated by FIGS. 1-3, the upper wall 303 of the first portion 153 of the housing 155 can substantially encapsulate the forming vessel 143 (e.g., the entire forming vessel as shown) to limit or prevent fluid communication through the upper wall 303 of the first portion of the housing 155 between the upper interior chamber 305 and an upper chamber 307. Throughout the application, the phrase "substantially encapsulate" or "encapsulate" designates a configuration where a desired pressure differential may be maintained between the upper interior chamber 305 and the upper chamber 307 without significant interference by leak paths or other inadvertent passages of gas between the upper interior chamber 305 and the upper chamber 307. Configurations that "substantially encapsulate" or "encapsulate" can define a structure capable of preventing inadvertent gas leakage between the upper interior chamber 305 and the upper chamber 307 such that a pressure differential of from about 5 pascal (Pa) to 60 Pa may be maintained between the upper interior chamber 305 and the upper chamber 307.

Referring to FIGS. 1 and 3, the upper chamber 307 can comprise a room of a building, a floor of a building, or an interior chamber of an outer housing. In some embodiments, the upper chamber 307 is sufficiently isolated from the upper interior chamber 305 of the first portion 153 of the housing 155 such that a pressure differential of from about 5 pascal (Pa) to about 60 Pa, such as from about 10 Pa to about 30 Pa can be maintained between the interior chamber and the upper chamber 307. As shown in some examples, many stations of the glass forming apparatus 101 may be positioned with the upper chamber 307 such as the storage bin 109, the melting vessel 105, the fining vessel 127, the mixing chamber 131 and the delivery vessel 133 as well as the forming vessel 143.

In some embodiments, portions or the entire forming vessel 143 and all of the stations of the glass forming apparatus upstream from the forming vessel 143 may be positioned within the upper chamber 307. Alternatively, less than all of the stations of the glass forming apparatus upstream from the forming vessel 143 may be positioned within the upper chamber 307. In some embodiments, portions or the entire forming vessel 143 may be positioned within the upper chamber 307 without any other station upstream from the forming vessel 143 being positioned within the upper chamber 307. In other embodiments, portions or the entire forming vessel 143 and the delivery vessel 133 may be positioned within the upper chamber 307 without any other station upstream from the delivery vessel 133 being positioned within the upper chamber 307. In further embodiments, portions or the entire forming vessel 143, the delivery vessel 133 and the mixing chamber 131 may be positioned within the upper chamber 307 without any other station upstream from the mixing chamber 131 being positioned within the upper chamber 307. In still further embodiments, portions or the entire forming vessel 143, the delivery vessel 133, the mixing chamber 131 and the fining vessel 127 may be positioned within the upper chamber 307 without any other station upstream from the fining vessel 127 being positioned within the upper chamber 307. In yet further embodiments, portions or the entire forming vessel 143, the delivery vessel 133, the mixing chamber 131, the fining vessel 127, and the melting vessel 105 may be positioned within the upper chamber 307 without any other station upstream melting vessel 105 being positioned within the upper chamber 307.

Figure 6:
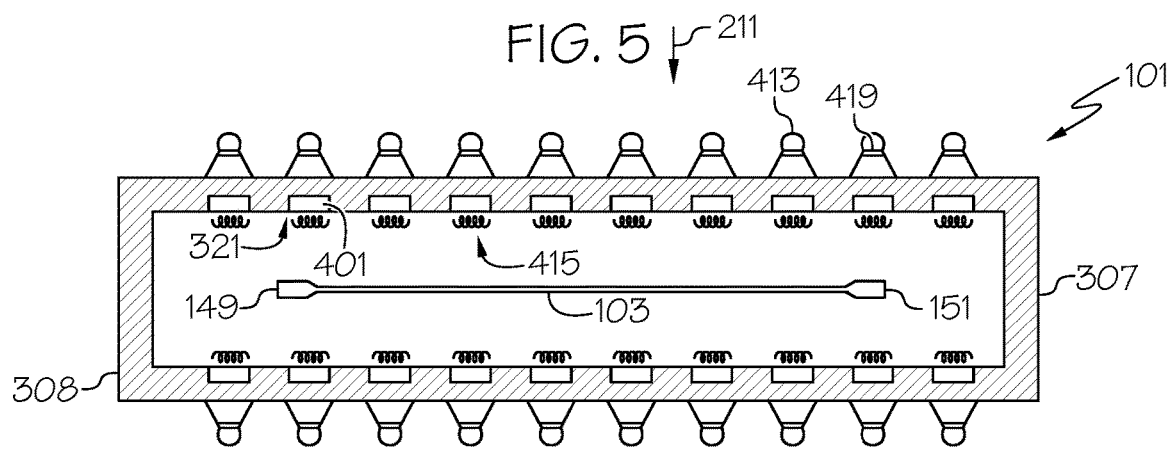
FIG. 6 is a schematic cross-sectional view of the fusion draw apparatus along line 6-6 of FIG. 3.

As shown in FIGS. 1-3, the glass ribbon 103 may be drawn along a draw path in the draw direction 211 to pass through a second portion 157 of the housing. Indeed, as shown in FIG. 3, the second portion 157 of the housing 155 can comprise the lower wall 308 defining a lower interior chamber 309. As shown in FIG. 6, the lower wall 308 can substantially circumscribe a lateral cross section of the glass ribbon 103 taken at a section perpendicular to the draw direction 211. As shown in FIG. 3, the second portion 157 of the housing 155 can be located at least partially within a lower chamber 311. Referring to FIGS. 1 and 3, the lower chamber 311 can comprise a room of a building, a floor of a building, or an interior chamber of an outer housing. In one example, the lower chamber 311 is positioned below the upper chamber 307. The lower chamber 311 and the upper chamber 307 may be at least partially isolated from one another, for example by partition 313. In one embodiment, the lower chamber can comprise a lower floor of a building and the upper chamber 307 can comprise another floor of the building positioned above the lower floor. In such embodiments, the partition 313 may include a ceiling of the lower floor and/or the ground of the upper floor.

Referring again to FIGS. 1 and 3, as mentioned above, the second portion 157 of the housing 155 can be located at least partially within the lower chamber 311. In further examples, as shown, the second portion 157 of the housing 155 also extends partially within the upper chamber 307. Indeed, embodiments of the disclosure can provide the second portion 157 of the housing 155 having an upper portion connected to the first portion 153 of the housing with the upper portion positioned within the upper chamber 307 and a lower portion of the second portion 157 positioned within the lower chamber 311. In such embodiments, as shown, a junction 304 between the upper wall 303 of the first portion 153 and the lower wall 308 of the second portion 157 may be located in the upper chamber 307 with an intermediate portion of the housing 155 passing through an opening 315 in the partition 313. In further examples, the second portion 157 may be provided that does not extend partially within the upper chamber 307. For example, the junction 304 may rest on an upper surface 312 of a partition 313 with the upper portion of the second portion 157 of the housing 155 passing through the opening 315 in the partition 313 with the remainder of the second portion 157 of the housing 155 extending within the lower chamber 311. In further examples, the junction 304 between the upper wall 303 and the lower wall 308 may be located within the opening 315 or within the lower chamber 311 with the lower wall 308 of the second portion 157 of the housing 155 extending partially or entirely within the lower chamber 311 without extending at least partially within the upper chamber 307.

As shown, embodiments of the disclosure can provide the opening 315 of the partition 313 with a larger footprint than an outer periphery 319 of the second portion 157 of the housing 155. In such embodiments, a fluid flow channel 317 may be defined between the outer periphery 319 of the second portion 157 of the housing 155 and the inner surface of the opening 315 of the partition 313. As will be appreciated from FIGS. 1 and 3, the fluid flow channel 317 can optionally circumscribe the entire outer periphery of the lower wall 308 of the second portion 157 of the housing 155. In some embodiments, it may be beneficial to provide the fluid flow channel 317 at least at locations facing one or more walls including vents discussed below to allow the vents to easily pass gas through the corresponding wall to flow upward into the upper chamber 307.

Figure 5:
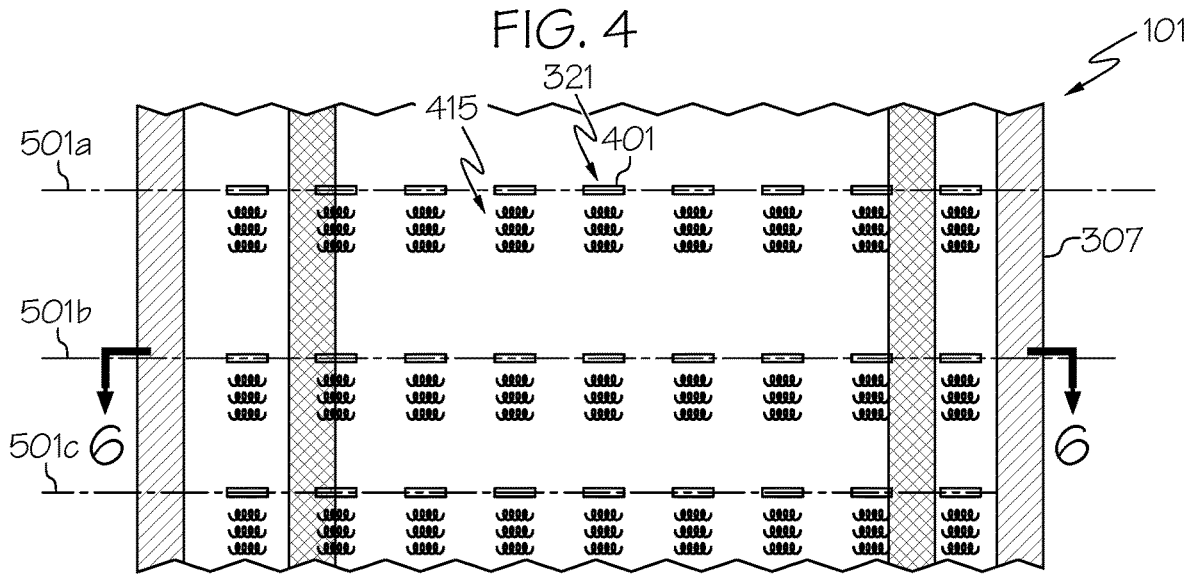
FIG. 5 is a schematic cross-sectional view of the fusion draw apparatus along line 5-5 of FIG. 3.

Embodiments of the glass forming apparatus 101 can include at least one vent. While a single vent may be provided, in further examples, a plurality of vents may be provided. Providing a plurality of vents may help control cooling at different lateral positions and/or elevational positions of the glass ribbon 103. By way of illustration, FIGS. 3, 5 and 6 schematically illustrate a plurality of vents 321. The illustrated vents 321 are identical to one another, although the vents may have different configurations depending on the particular application or location along the draw path. For instance, the size of the vents may differ from one another depending on the expected flow rate of gas passing through the lower wall 308 of the housing 155. As shown in FIG. 3, the vents 321 may extend through the lower wall 308 at or just below the junction 304 between the upper wall 303 and the lower wall 308. Furthermore, in some embodiments, as shown, the vents may be provided to intake and/or expel gas within the upper chamber 307, the fluid flow channel 317 and/or the lower chamber 311. In some embodiments, the vents may be provided to intake and/or expel gas within a single one or any combination of the upper chamber 307, the fluid flow channel 317 and/or the lower chamber 311.

Figure 4:
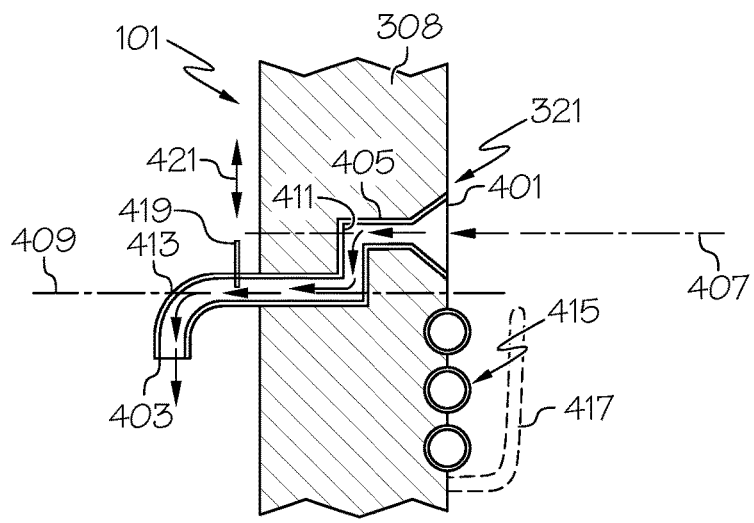
FIG. 4 is an enlarged schematic view of a vent taken at view 4 of FIG. 3.

The vents 321 can comprise forced gas vents wherein a mechanical gas moving device (e.g., fan, blower) directly connected to an inlet, outlet or intermediate portion of the vent to force gas to pass through the vents. Alternatively, as shown, the vents 321 can comprise "natural vents". Throughout the application, "natural vent" or "natural vents" is intended to refer to vents that do not include a mechanical gas moving device (e.g., fan, blower) or conduit connected to the inlet, outlet or intermediate portion of the vent to force gas to pass through the vents. Rather, "natural vents" rely on pressure differentials between gas at the inlet and glass at the outlet to naturally vent gas through the vent based on the pressure differential. In the illustrated embodiments, the vents 321 comprise natural vents that naturally vent gas at a rate depending on pressure differentials between at least two chambers selected from: (1) the upper and/or lower interior chamber 305, 309 of the housing 155; (2) the upper chamber 307; and (3) the lower chamber 311. Furthermore, as shown in FIG. 4, the vents 321 do not include a mechanical gas moving device (e.g., fan, blower) or conduit connected to an inlet 401, an outlet 403, or an intermediate portion 405 of the vent. Compared to vents associated with a mechanical gas moving device, the illustrated natural vents that do not include a mechanical gas moving device in direct communication with the inlet 401, the outlet 403 or the intermediate portion 405 of the vents 321; thereby simplifying the venting arrangement, reducing costs associated with assembly, maintenance and/or operation of the venting arrangement, and/or reducing the size of the footprint associated with the second portion 157 of the housing 155.

Referring to FIG. 4, the inlet of the vent 321 can optionally include a tapered inlet to facilitate fluid flow into the inlet 401. Furthermore, the intermediate portion 405 of the vent 321 can optionally comprise an upstream path 407 that is offset from a downstream path 409. Providing offset paths allows radiated heat traveling in a direction of the upstream path 407 to be exposed to an intermediate area 411 of the vent 321 and corresponding intermediate portion of the lower wall 308 of the housing 155. Due to the possible insulating nature of the lower wall 308 that may comprise a low thermal conducting refractory material, exposing the radiated heat to the intermediate area 411 of the vent 321 and or corresponding intermediate portion of the lower refractory wall 308 can reduce undesired and/or uncontrolled heat loss by radiation that may otherwise pass through the vent to areas outside of the lower wall 308 or rear portions of the vent that may act as a heat sink.

Further referring to FIG. 4, the vent 321 may optionally include a fitting, such as the illustrated 90° elbow fitting 413 configured to redirect glass flowing through the fitting. Such optional fittings may be provided to help avoid unnecessary heating of structures adjacent to the outlet 403. For example, as shown, the 90° elbow fittings 413 within the fluid flow channel 317 can prevent inadvertent heating of the partition 313 adjacent the outlets 403 of fittings within the opening 315 of the partition 313. In further embodiments, other fittings may be provides, such as a diffuser or other fitting arrangement. In still further embodiments, the vent 321 may not include a fitting but simply vent from an outlet port without a fitting.

In further examples, the fittings may help encourage fluid flow in a desired direction to help increase or decrease resistance of natural venting through the vents. For example, as shown in FIG. 3, the outlet 403 of the elbow fittings 413 may increase natural resistance to natural venting by being oriented downward such that gas 322 naturally venting through the vents 321 flows against a flow 323 of gas passing through the fluid flow channel 317 from the lower chamber 311 to the upper chamber 307. Although not shown, in some or all of the vents, the outlet 403 of the elbow fittings 413 may decrease natural resistance to natural venting of gas through the vents 321 by being oriented upward such that gas 322 naturally venting through the vents 321 flows in the same general direction as the flow 323 of gas passing through the fluid flow channel 317 from the lower chamber 311 to the upper chamber 307. The fittings, if provided, may be provided with all of the vents 321 or only a selected set of vents.

One or all of the vents 321 may also include a fluid resistor, such as the illustrated gate 419 designed to modify the resistance of a flow of gas passing through the vent. In the illustrated embodiment, the gate 419 can comprise a plate that may be moved in the directions of the double-headed arrow 421 to adjust the resistance of a flow of gas passing through the vent. Indeed, the gate 419 may be moved in one direction of the double-headed arrow 421 to fully open the fluid flow path to reduce or even eliminate resistance of fluid flow by the gate, thereby maximizing natural gas venting through the vent 321. In another example, the gate 419 may be moved in an opposite direction of the double-headed arrow 421 to fully close the fluid flow path to maximize the resistance of fluid flow by the gate, thereby preventing gas flow through the corresponding vent 321. In further examples, the gate 419 can be adjusted to be partially closed to fine tune the amount of natural venting that occurs through the vent, thereby controlling the amount of cooling being provided by the natural vent.

As mentioned previously, the at least one vent may comprise the illustrated plurality of vents 321. The plurality of vents may optionally be arranged in a single row of vents or a plurality of rows of vents. For example, as illustrated in FIG. 5, the plurality of vents may include a first subset of vents arranged along a first vent axis 501a that is transverse to the draw path of the glass ribbon in the draw direction 211. As shown, the first vent axis 501a is perpendicular to the draw path of the glass ribbon in the draw direction 211, although the first vent axis 501a may be provided at other transverse angles relative to the draw direction 211 in further examples.

In one embodiment, as shown, the vents 321 of the first vent axis may be equally sequentially spaced from one another along the first vent axis 501a that may comprise the illustrated straight vent axis. Alternatively, although not shown, spacing between at least two of the subset of vents along the first vent axis 501a may have a different spacing than between another two of the subset of vents along the first vent axis 501a. In one embodiment, different spacing may be provided to target different portions of the glass ribbon 103 with customized natural venting arrangements to provide a desired cooling profile. For instance, the spacing between a pair of vents of the subset of vents along the first vent axis 501a may be closer to one another in a central portion of the first vent axis 501a than a pair of vents of the subset of vents along the first vent axis 501a at respective edge portions of the first vent axis 501a. In such a manner, cooling may be enhanced in a central region of the glass ribbon relative to edge portions of the glass ribbon to help balance cooling or otherwise provide a desired cooling profile across the width "W" of the glass ribbon 103.

As further shown in FIG. 5, further embodiments may optionally include a plurality of rows of vents that are offset from one another in the draw direction 211. For instance, the vents may be arranged along one or more additional vent axes (e.g., 501b, 501c) in a similar or identical way to the first vent axis 501a discussed above. Furthermore, optionally, as shown in FIG. 5, the subsets of vents may also be arranged in aligned vertical straight columns of vents such that a single matrix of vents are provided along intersections of vent axes and vent columns. Alternatively, although not shown, the vents of adjacent vent axes may be staggered relative to one another rather than aligned along respective vent columns.

As further shown, additional heat transfer devices may be associated with one or more of the vents 321. For example, as shown, each vent includes at least one heater winding such as the illustrated three heater windings 415. The heater windings 415 can provide heat by electrical resistance due to electrical current running through the heater windings 415. The heater windings 415 may be independently operated relative to one another to provide a desired heat transfer profile. In operation, the heater windings 415 may be operated to provide a desired level of heating of the glass ribbon 103 at the desired location to slow the cooling of the glass ribbon at that location. Furthermore, as shown in broken lines in FIG. 4, one or more optional cooling coils 417, such as liquid cooled tubes bent into a compact serpentine shape may be provided, for example at the location of the heater windings. Such cooling coils 417, if provided, may enhance cooling of the glass ribbon by running cooling fluid through the cooling tubes to carry away heat absorbed by the cooling coils. As shown, the heater winding 415 may be provided adjacent the inlet 401 of each of the plurality of vents 321, although the heater windings may be provided at only a selected subset of the plurality of the vents or at different locations in further embodiments. Likewise, the cooling coils 417, if provided, may also be provided adjacent the inlet 401 of each of the plurality of vents 321, although the cooling coils may be provided at only a selected subset of the plurality of vents or at different locations in further embodiments.

In some embodiments, a mechanical gas moving device (e.g., fan, blower) may be placed in fluid communication with the upper chamber 307 to increase the pressure of the gas within the upper chamber 307. In addition or alternatively, the same or a different mechanical gas moving device (e.g., fan, blower) may be placed in fluid communication with the lower chamber 311 to increase the pressure of the gas within the lower chamber 311. For instance, as shown in FIGS. 1 and 3, a first fan or blower 325 may be placed in fluid communication with the upper chamber 307 to increase the pressure of the gas within the upper chamber 307. As further illustrated, a second fan or blower 327 may be placed in fluid communication with the lower chamber 311 to increase the pressure of the gas within the lower chamber 311. In one embodiment, the first fan or blower 325 may draw gas (e.g., air) from outside of the glass forming apparatus 101, such as filtered air. Alternatively, as shown, a feedback conduit 326 may be provided to recirculate gas within the upper chamber 307. In another embodiment, the second fan or blower 325 may draw gas (e.g., air) from outside of the glass forming apparatus, such as filtered air. Alternatively, as shown, a feedback conduit 328 may be provided to circulate air from the upper chamber 307 to the lower chamber 311. Recirculating air with the feedback conduits 326, 328 may be beneficial in certain embodiments to avoid introduction of contaminating debris that may undesirably contaminate the glass ribbon 103 that may otherwise occur when introducing gas (e.g., air) from the surrounding environment.

In one embodiment, a first pressure sensor 329 may sense a pressure within the upper chamber 307 and provide sensed information to a controller 331. Based at least in part on the sensed pressure within the upper chamber 307 by the first pressure sensor 329, the controller 331 may adjust the speed of the first fan or blower 325 to achieve the desired pressure within the upper chamber 307 by way of a control feedback loop.

In another embodiment, a second pressure sensor 333 may sense a pressure within the lower chamber 311 and provide sensed information to a controller 331. Based at least in part on the sensed pressure within the lower chamber 311 by the second pressure sensor 333, the controller 331 may adjust the speed of the second fan or blower 327 to achieve the desired pressure within the lower chamber 311 by way of a control feedback loop.

In still another embodiment, a third pressure sensor 335 may sense a pressure within the upper interior chamber 305 and/or the lower interior chamber 309 and provide sensed information to the controller 331. Based at least in part on the sensed pressure within the upper and/or lower interior chamber 305, 309 by the third pressure sensor 335, the controller 331 may adjust the speed of the first fan or blower 325 and/or the second fan or blower 327 to achieve the desired pressure within the upper and/or lower interior chamber 305, 309 by way of a control feedback loop.

In yet another embodiment, a pressure difference between at least one pair of the first pressure sensor 329, the second pressure sensor 333 and the third pressure sensor 335 may be determined. Based at least in part on the sensed pressure difference within a pair of the chambers associated with the sensors, the controller 331 may adjust the speed of the first fan or blower 325 and/or the second fan or blower 327 to achieve the desired pressure differential by way of a control feedback loop.

Methods of producing the glass ribbon 103 may include the step of drawing a quantity of molten material 121 from a forming vessel into the glass ribbon. In one example, as shown in FIG. 2, the forming vessel 143 can comprise a trough 201 and a forming wedge 209 that fusion draws the glass ribbon 103 off the root 145 of the forming wedge 209 of the forming vessel 143 as discussed more fully above. In another option, the forming vessel may comprise a slot draw device, a press-roll device or other down-draw device. As shown in FIG. 3, the forming vessel 143 can be positioned within an upper interior chamber 305 of the first portion 153 of the housing 155 located within the upper chamber 307.

Methods of producing the glass ribbon 103 may further include the step of drawing the glass ribbon 103 along a draw path in the draw direction 211 such that the glass ribbon passes through the lower interior chamber 309 of the second portion 157 of the housing 155. As shown in FIG. 3, the second portion 157 of the housing 155 is located partially within the lower chamber 311.

Methods of producing the glass ribbon 103 can further include venting gas from an interior of the housing (e.g., the lower interior chamber 309) through the lower wall 308 of the second portion 157 of the housing 155. In one embodiment, venting the gas can include passing the venting gas through the at least one vent 321 discussed above. Furthermore, as illustrated and discussed above, the vent 321 can comprise a natural vent wherein the gas is naturally vented through the lower wall 308 of the second portion 157 of the housing 155.

In further embodiments, the methods can include adjusting the vent 321 to modify the resistance of a flow of gas passing through the vent during the step of venting the gas through the lower wall of the second portion of the housing. For example, the gate 419 may be adjusted to modify the resistant to provide a desired level of natural venting through the corresponding vent 321. As discussed above, in some examples, the at least one vent 321 may include the illustrated plurality of vents that may extend along one or more of the vent axes 501*a*, 501*b*, 501*c*. In such examples, at least two or more of the plurality of vents may be adjusted (e.g., with the corresponding gate 419) to modify a relative resistance of gas flowing through the respective adjusted vents. As such, the relative natural venting that occurs with each of the vents 321 may be adjusted to provide a desired cooling profile across a width and/or at different elevations of the glass ribbon. For instance, vents 321 comprising inlets 401 facing a central portion of the glass ribbon may be adjusted to reduce resistance to venting, thereby increasing natural venting at the central location. At the same time, vents 321 comprising inlets 401 facing outer edge portions of the glass ribbon 103 may be adjusted to increase resistance to venting, thereby reducing natural venting at the edge portions of the glass ribbon 103. Consequently, the cooling profile across the width "W" of the glass ribbon 103 may be adjusted to provide a desired cooling profile.

In some embodiments, the methods of producing the glass ribbon 103 can further include the step of maintaining a pressure difference between the lower chamber 311 and the upper chamber 307, wherein a pressure of the lower chamber 311 is greater than a pressure of the upper chamber 307. Maintaining the pressure of the lower chamber 311 at a pressure that is higher than the pressure in the upper chamber 307 can produce the flow 323 from the lower chamber 311 to the upper chamber 307 through the fluid flow channel 317. Such fluid flow can help draw gas 322 naturally venting from the vents 321. Furthermore, maintaining the pressure of the lower chamber 311 at a pressure that is higher than the pressure in the upper chamber 307 can help increase the pressure within lower interior chamber 309 and/or upper interior chamber 305, thereby further encouraging gas to be forced into the inlet 401 of the vents 321. Indeed, gas within the lower chamber 311 can flow along flow path 337 into a lower end of the second portion 157 of the housing 155 to naturally vent through the lower wall 308 by way of the vents 321. In some embodiments the pressure difference between the lower chamber 311 and the pressure within the upper chamber 307 can be from 2 Pascal (Pa) to about 12 Pascal (Pa), such as from about 5 Pa to about 8 Pa. That is, the pressure within the lower chamber 311 can be from about 2 Pa to about 12 Pa, such as from about 5 Pa to about 8 Pa greater than the pressure within the upper chamber 307. In some embodiments, such pressure difference may be maintained by sensing pressure within the upper chamber 307 (e.g., with the first pressure sensor 329) and sensing the pressure within the lower chamber 311 (e.g., with the second pressure sensor 333) and controlling the pressure difference with the controller 331 that operates one or both of the first fan or blower 325 and/or the second fan or blower 327 based on feedback from the pressure sensors.

In further embodiments, methods of producing the glass ribbon 103 can include the step of maintaining a pressure difference between the interior of the housing 155 (e.g., the upper interior chamber 305 and/or the lower interior chamber 309) and the upper chamber 307, wherein a pressure of the interior of the housing 155 is greater than the pressure of the upper chamber 307. In some examples, the upper interior chamber 305 and the lower interior chamber 309 may have substantially the same pressure wherein pressure may be measured in either the upper interior chamber 305 or the lower interior chamber 309. In further examples, there may be a pressure difference within the interior of the housing, particularly along the elevation of the second portion 157 of the housing 155. As such, further embodiments may include placing one or a plurality of sensors along different portions of the interior of the housing, such as at different elevations within the second portion 157 of the housing 155. In embodiments with different pressures within the interior of the housing, the "interior pressure" of the housing is considered the average pressure within the interior of the housing.

Maintaining the pressure of the gas within the interior of the housing 155 at a higher pressure than the gas within the upper chamber 307 can help naturally vent gas from the interior of the housing through the lower wall 308 by way of the vents 321. In some embodiments, the pressure difference between the interior of the housing 155 and the upper chamber 307 is from about 5 pascal (Pa) to about 60 pascal (Pa), such as from about 10 Pa to about 30 Pa. That is, the pressure within the interior of the housing 155 can be from about from about 5 Pa to about 60 Pa, such as from about 10 Pa to about 30 Pa greater than the pressure within the upper chamber 307. In some embodiments, such pressure difference may be maintained by sensing pressures within the interior of the housing 155 (e.g., with the third pressure sensor 335) and sensing the pressure within the upper chamber 307 (e.g., with the first pressure sensor 329) and controlling the pressure difference with the controller 331 that operates one or both of the first fan or blower 325 and/or the second fan or blower 327 based on feedback from the pressure sensors.

In some embodiments, the method of producing a glass ribbon can further include the step of introducing gas into the upper chamber 307 to facilitate maintaining the pressure of the upper chamber 307. For instance, in one embodiment, the first fan or blower 325 can recirculate gas within the upper chamber 307 such that gas is introduced at outlet 339 into the upper chamber 307. Alternatively, although not shown, gas (e.g., filtered gas) may be introduced into the upper chamber 307 without recirculating gas within the upper chamber 307.

In further embodiments, the method of producing a glass ribbon can further include the step of introducing gas into the lower chamber 311 to facilitate maintaining the pressure of the lower chamber 311. For instance, as shown, gas may optionally be drawn from the upper chamber 307 to be circulated into the lower chamber 311 to facilitate maintaining the pressure of the lower chamber. Although not shown, gas (e.g., filtered gas) may be introduced into the lower chamber 311 from outside of the glass forming apparatus 101.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes embodiments having two or more such light sources unless the context clearly indicates otherwise. Likewise, a "plurality" or an "array" is intended to denote "more than one." As such, a "plurality" or "array" of cavities includes two or more such elements, such as three or more such cavities, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

Embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine readable storage substrate, a memory device, or a combination of one or more of them.

The term "processor" or "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An apparatus for producing a glass ribbon comprising:
   an upper chamber;
   a lower chamber;
   a forming vessel;
   a housing comprising a first portion housing the forming vessel, the first portion of the housing located within the upper chamber;
   a draw path from the forming vessel passing through a second portion of the housing at least partially located within the lower chamber; and
   at least one vent to vent gas from an interior of the housing through a wall of the second portion of the housing.

2. The apparatus of claim 1, wherein the draw path extends from a root of a wedge of the forming vessel.

3. The apparatus of claim 1, wherein the at least one vent comprises a natural vent.

4. The apparatus of claim 1, wherein the at least one vent includes an upstream path that is offset from a downstream path.

5. The apparatus of claim 1, wherein the at least one vent comprises an adjustable resistance to gas flowing through the at least one vent.

6. The apparatus of claim 1, wherein the at least one vent comprises a plurality of vents.

7. The apparatus of claim 6, wherein the plurality of vents are positioned along a vent axis transverse to the draw path.

8. The apparatus of claim 6, wherein at least two of the plurality of vents are adjustable to modify a relative resistance of gas flowing through the at least two adjusted vents.

9. The apparatus of claim 1, further comprising a fan or blower in fluid communication with the upper chamber to increase a pressure of the gas within the upper chamber.

10. The apparatus of claim 1, further comprising a fan or blower in fluid communication with the lower chamber to increase a pressure of the gas within the lower chamber.

11. The apparatus of claim 10, wherein the fan or blower is configured to move gas through a feedback conduit to circulate air from the upper chamber to the lower chamber to increase the pressure of the gas within the lower chamber.

12. The apparatus of claim 1, further comprising a controller programmed to maintain a pressure difference between the lower chamber and the upper chamber.

13. The apparatus of claim 12, wherein the controller is programmed to adjust a speed of a fan or blower to maintain the pressure difference.

14. The apparatus of claim 12, wherein the pressure difference is provided by maintaining a pressure of the lower chamber greater than a pressure of the upper chamber.

15. The apparatus of claim 14, wherein the pressure difference is from about 2 Pa to about 12 Pa.

16. The apparatus of claim 1, further comprising a controller programmed to maintain a pressure difference between the interior of the housing and the upper chamber.

17. The apparatus of claim 16, wherein the controller is programmed to adjust a speed of a fan or blower to maintain the pressure difference.

18. The apparatus of claim 16, wherein the pressure difference is provided by maintaining a pressure of the interior of the housing greater than a pressure of the upper chamber.

19. The apparatus of claim 16, wherein the pressure difference is from about 5 Pa to about 60 Pa.

20. The apparatus of claim 1, further comprising a partition at least partially isolating the lower chamber from the upper chamber.

21. The apparatus of claim 20, wherein the partition comprises an opening, and the second portion of the housing passes through the opening.

22. The apparatus of claim 21, wherein a fluid flow channel is defined between an outer periphery of the second portion of the housing and an inner surface of the opening of the partition.

* * * * *